US012121917B2

(12) United States Patent
Bilquez

(10) Patent No.: US 12,121,917 B2
(45) Date of Patent: Oct. 22, 2024

(54) FLUID PRODUCT DISPENSER

(71) Applicant: APTAR FRANCE SAS, Le Neubourg (FR)

(72) Inventor: Sébastien Bilquez, Marcilly sur Eure (FR)

(73) Assignee: APTAR FRANCE SAS, Le Neubourg (FR)

( * ) Notice: Subject to any disclaimer, the term of this patent is extended or adjusted under 35 U.S.C. 154(b) by 32 days.

(21) Appl. No.: 18/185,021

(22) Filed: Mar. 16, 2023

(65) Prior Publication Data

US 2023/0294118 A1 Sep. 21, 2023

(30) Foreign Application Priority Data

Mar. 17, 2022 (FR) .................................. FR2202353

(51) Int. Cl.
*B05B 11/00* (2023.01)

(52) U.S. Cl.
CPC ...... *B05B 11/0097* (2013.01); *B05B 11/0029* (2013.01); *B05B 11/0044* (2018.08); *B05B 11/0089* (2013.01)

(58) Field of Classification Search
CPC ............. B05B 11/0089; B05B 11/0044; B05B 11/0029; B05B 11/0097
See application file for complete search history.

(56) References Cited

U.S. PATENT DOCUMENTS 5,890,624 A * 4/1999 Klima ................. B05B 11/1081 222/129
6,126,042 A 10/2000 Meshberg
10,981,187 B2 * 4/2021 McGarry ................ B05B 15/33

FOREIGN PATENT DOCUMENTS

EP 3 310 491 B1 8/2019
KR 10-2009-0127979 A 12/2009
WO WO-0004997 A1 * 2/2000 ............. B05B 11/00

OTHER PUBLICATIONS

French Search Report for FR 2202353 dated Oct. 19, 2022.

* cited by examiner

*Primary Examiner* — Jason K Niesz
(74) *Attorney, Agent, or Firm* — Sughrue Mion, PLLC

(57) ABSTRACT

Fluid product dispenser (D) having a reservoir (R) defining a bottom (R1) and an opening (R2), and a dispensing head (T) integrating a dispensing member (P) defining a vent path through which outside air can penetrate into the reservoir (R). The dispensing member (P) has a dip tube (TP) that extends into the reservoir (R), the dip tube (TP) having an inlet (Ti) close to the bottom (R1) of the reservoir (R). The inlet (Ti) of the dip tube (TP) is provided with a shut-off valve (V) having a movable member (V6) and a seat (V5), the movable member (V6) is urged into sealed contact with the seat (V5) by the fluid product when the dispenser (D) is upside down, while the movable member (V6) is urged away from the seat (V5) by the fluid product when the dispenser (D) is upright.

10 Claims, 10 Drawing Sheets

FLUID PRODUCT DISPENSER

The present invention relates to a fluid product dispenser comprising:

a fluid product reservoir defining a bottom and an opening, and a dispensing head mounted on and in the opening of the fluid product reservoir, the dispensing head integrating a dispensing member, such as a pump, defining a vent path through which outside air can penetrate into the fluid product reservoir, the dispensing member further comprising a dip tube that extends into the reservoir, the dip tube comprising an inlet close to the bottom of the fluid product reservoir.

The dispensing member generally comprises an actuation rod that is movable back-and-forth and that communicates with the dip tube through a chamber and at least one inlet and/or outlet valve. The dispensing head also comprises a pusher that is removably mounted on the actuation rod.

This is an entirely conventional design for a manual dispenser in the fields of perfumery, cosmetics, and pharmacy. The user presses on the pusher, thereby depressing the actuation rod, which discharges fluid product from the chamber through the outlet valve that is forced into the open state. When the pressure on the pusher is released, fluid product from the reservoir is sucked into the chamber through the dip tube and the inlet valve. Simultaneously, outside air penetrates into the reservoir through the open vent path, in order to compensate for the volume of fluid product sucked in by the dispensing member. The reservoir is thus always at atmospheric pressure. The outlet valve and the vent path are opened by depressing the actuation rod. All of operation is entirely conventional for a manual dispenser.

When the reservoir is empty, it is sometimes possible to fill it, when the dispensing head is removable, for example by unscrewing.

Document EP 3310491 describes a particular method of filling, without having to remove the dispensing head. It is sufficient for the pusher to be removable, which is the case for most dispensers. Thus, after the pusher has been withdrawn, the dispenser is disposed upside down, and fluid product is injected under pressure into the reservoir, not through the actuation rod, the chamber, and the dip tube, but through the vent path, which is forced into the open state by the actuation rod being depressed, even in part. And the air contained in the reservoir is discharged through the dip tube, the chamber and the actuation rod: the communication being opened by the actuation rod being depressed.

When the fluid product that fills the reservoir arrives at the inlet of the dip tube (disposed upside down), it is discharged through the dip tube. This overflow of fluid product spilled through the dip tube is finally collected by an absorbent ring, which must then be discarded. Furthermore, the reservoir is overfilled, since it no longer contains the minimum volume of air necessary to compensate for temperature and/or pressure variations. The filling according to this document leads to a double disadvantage, namely a dangerous reservoir and a waste (ring soaked with fluid).

The object of the present invention is to overcome the abovementioned disadvantages of this prior art document by preventing the reservoir from being filled excessively and by eliminating the overflow being spilled through the dip tube.

To do this, the present invention proposes a fluid product dispenser comprising:

a fluid product reservoir defining a bottom and an opening, and a dispensing head mounted on and in the opening of the fluid product reservoir, the dispensing head integrating a dispensing member, such as a pump, defining a vent path through which outside air can penetrate into the fluid product reservoir, the dispensing member further comprising a dip tube that extends into the reservoir, the dip tube comprising an inlet close to the bottom of the fluid product, characterized in that the inlet of the dip tube is provided with a shut-off valve comprising a movable member and a seat, the movable member is urged into sealed contact with the seat by the fluid product when the dispenser is upside down with the fluid product reservoir disposed above the dispensing head, while the movable member is urged away from the seat by the fluid product when the dispenser is upright with the dispensing head disposed above the fluid product reservoir.

Thus, when the reservoir disposed upside down is filled with the method of document EP3310491, the shut-off valve will close off the inlet of the dip tube as soon as the fluid product reaches it. Its movable member is moved by the fluid product against the seat, thereby cutting off communication with the dip tube. Thus, the fluid cannot be discharged through the dip tube.

Advantageously, the movable member has a density lower than that of the fluid product, such that it floats in the fluid product. The movable member can be made of a solid material, the density of which is less than that of the fluid product and/or contains air or another gas.

According to another aspect of the invention, the fluid product reservoir with the dispensing head mounted thereon and therein defines a useful volume, the seat being disposed in the fluid product reservoir in the vicinity of the bottom, so as to maintain in the fluid product reservoir, which is filled with fluid via the vent path with the dispenser upside down, a quantity of air that is sufficient to absorb pressure and/or temperature variations. Thanks to the shut-off valve, the quantity of air remaining can be adjusted to a value that makes it possible to guarantee the integrity of the dispenser even in case of significant temperature and/or pressure variations.

According to a feature of the invention, the shut-off valve can comprise a valve body forming the seat and a connection sleeve for the inlet of the dip tube, the movable member being trapped in the valve body with an axial degree of freedom enabling it to come selectively into sealed contact with the seat.

According to an embodiment, the movable member can be a hollow ball. In this case, the seat and the ball can be disposed beside the dip tube.

According to another embodiment, the movable member can be a cap engaged around the valve body, the seat extends around the dip tube and the cap defines an annular contact zone intended to come into sealed contact with the seat, this annular contact zone extending around the dip tube.

It can clearly be seen that the shut-off valve of the present invention considerably improves the filling method of document EP3310491. Instead of discharging the fluid product overflow into the absorbent ring, the valve of the invention shuts off the dip tube. The injection of fluid product can continue after the shut-off valve has been closed, leading to an overpressure in the reservoir which results in the remaining air being compressed.

In order to reduce or avoid this overpressure in the reservoir, the shut-off valve can be provided with a device providing perceptible information, in particular a sound that is perceptible to a user, the perceptible information being generated in response to an airflow passing through the shut-off valve. For example, it is possible to provide a sound device that emits a sound generated by the passage of the airflow. The sound can be continuous like a whistling or jerky like a clicking sound. It can be amplified by the walls of the reservoir. The user is therefore informed of the filling of the reservoir by stopping the sound. It is also possible to modify the sound of the device when the movable member of the valve moves towards its seat: the user perceives this modification of the sound and then knows that the reservoir is almost full. At worst, stopping the sound indicates that the tank is full. It is even possible to imagine that the sound is produced by the valve member which moves under the effect of the air flow. By way of example, the ball of the valve can be agitated and knocked against the valve body, thereby generating a sound that is perceptible to human hearing. Instead of or in addition to the sound, the device can generate a vibration that is perceptible to the touch.

The present invention also defines an assembly comprising a source of fluid product, an adapter defining a filling duct and a vent duct, and a dispenser according to any one of the preceding claims, the adapter making it possible to connect the source of fluid product to the dispenser so as to make a fluid product flow and an airflow to intersect each other, the adapter being provided with a device providing perceptible information, in particular a sound that is perceptible to a user, the perceptible information being generated in response to an airflow passing through the air duct of the adapter.

In a variant, a detector can be provided that detects the absence of airflow, the detector thus sending a stop signal that stops the injection of fluid product. This is an active, even electronic, version, while the device mentioned above is passive.

The present invention also defines a method for filling a dispenser such as defined above, the dispensing head comprising a pusher that is removably mounted on an actuation rod that is in fluid communication with the dip tube via a chamber and at least one valve, the method comprising the following steps:

a—removing the pusher from the actuation rod, b—arranging the dispenser upside down with the fluid product reservoir disposed above the dispensing head, c—depressing the actuation rod to open the vent path and the fluid communication between the actuation rod and the dip tube, d—injecting fluid product through the vent path, by allowing air from the reservoir to escape through the dip tube and the actuation rod, until the fluid product injected into the reservoir urges the movable member into sealed contact against the seat.

The spirit of the present invention is based on using the Archimedean buoyancy force of the fluid product stored in the reservoir disposed upside down to actuate a shut-off valve that closes off access to the dip tube, in order to avoid overfilling the reservoir and spilling the overflow through the dip tube.

The invention will now be described more fully below, with reference to the accompanying drawings which show two embodiments of the invention by way of non-limiting examples.

In the figures:

FIG. 1*a* is a schematic vertical cross-sectional view through a fluid product dispenser of the invention disposed upside down and ready to be connected to an adapter mounted on a fluid product source;

FIG. 1*b* is a view similar to the view in FIG. 1*a* with the dispenser of the invention connected to the adapter;

Figure 4A:
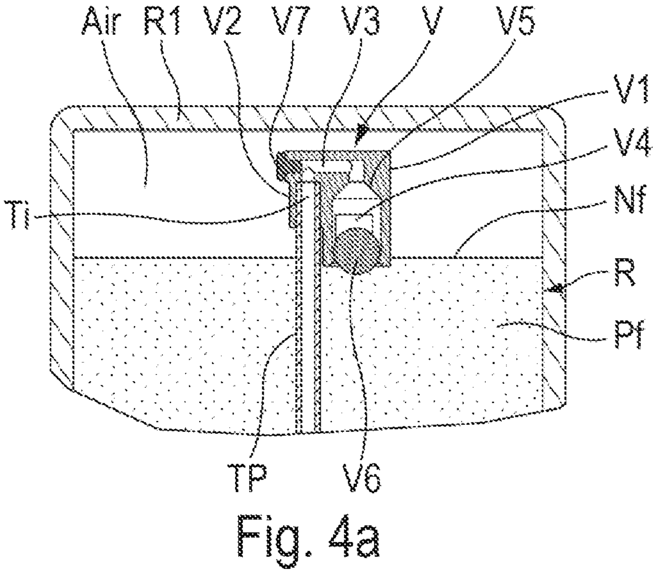
Figure 4B:
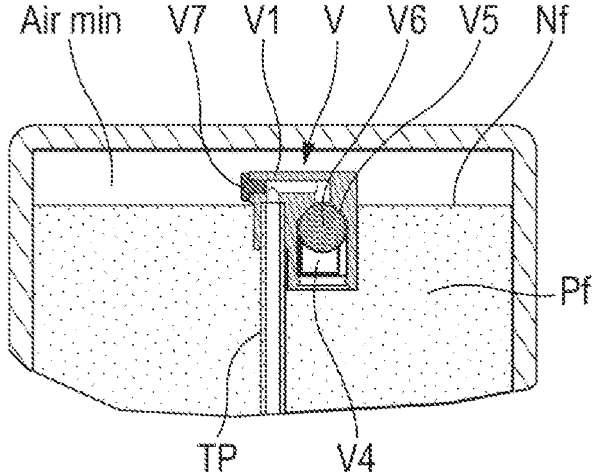

FIGS. 4*a* and 4*b* are views showing the shut-off valve according to a first embodiment of the invention in the open and closed positions, respectively, FIG. 4*b* see FIG. 4*a*

Figure 4C:
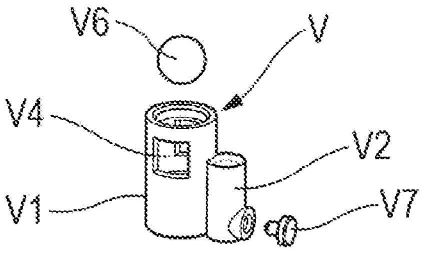
Figure 5A:
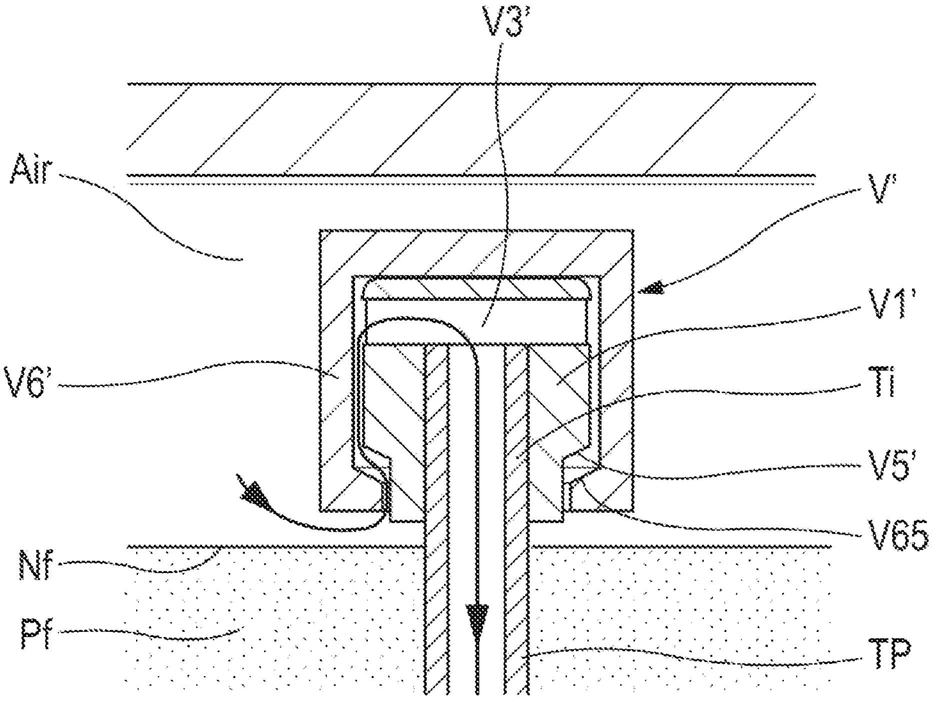
Figure 5B:
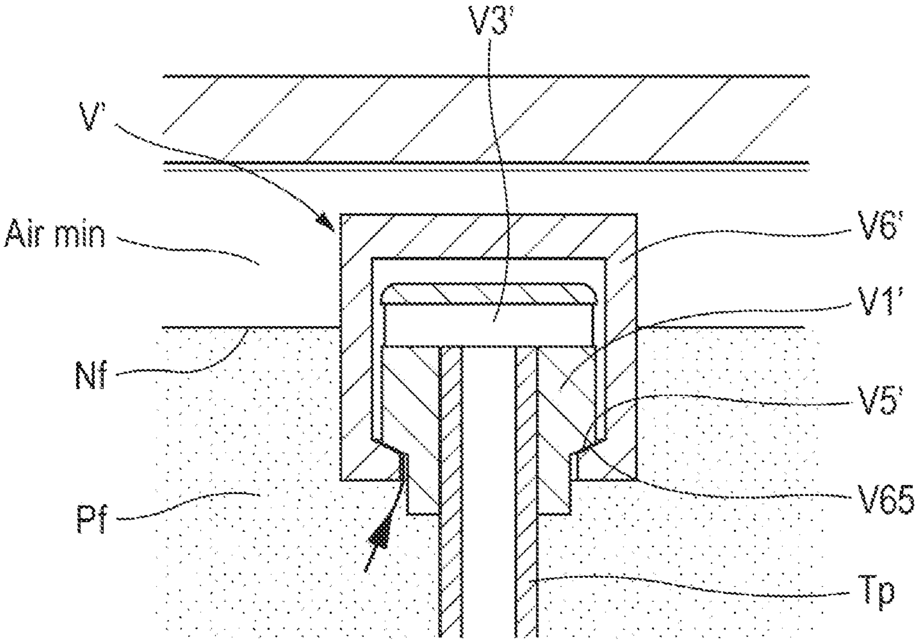
Figure 6A:
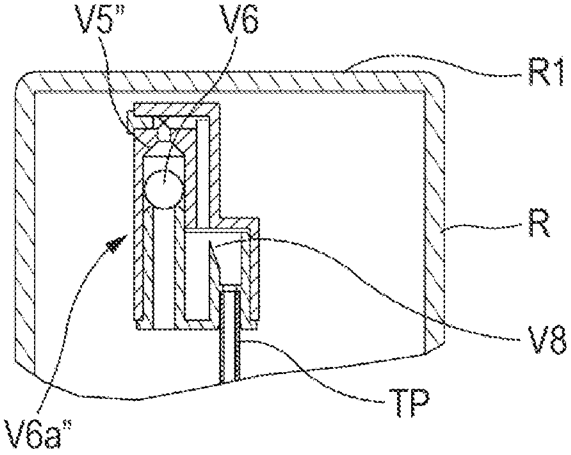
Figure 6B:
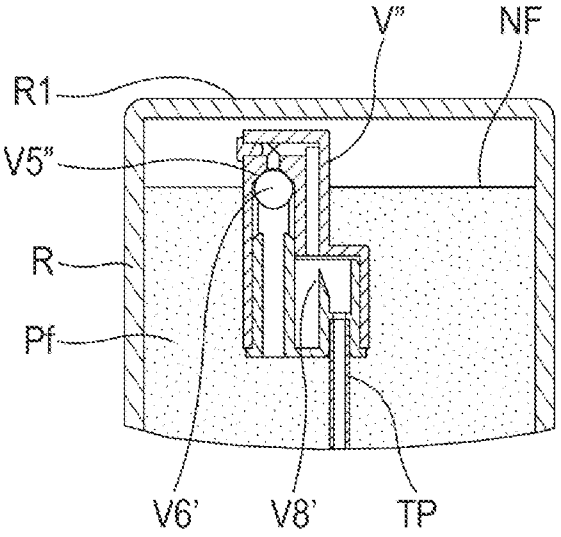

FIG. 4*c* is an exploded view of the shut-off valve according to this first embodiment of the invention, FIGS. 5*a* and 5*b* are views similar to FIGS. 4*a* and 4*b* showing a shut-off valve according to a second embodiment of the invention, FIG. 5*b* see FIG. 5*a* FIG. 6*a* FIGS. 6*a* and 6*b* are views similar to FIGS. 4*a* and 4*b* showing a shut-off valve according to a third embodiment of the invention, FIG. 6*b* see FIG. 6*a*

Figure 2:
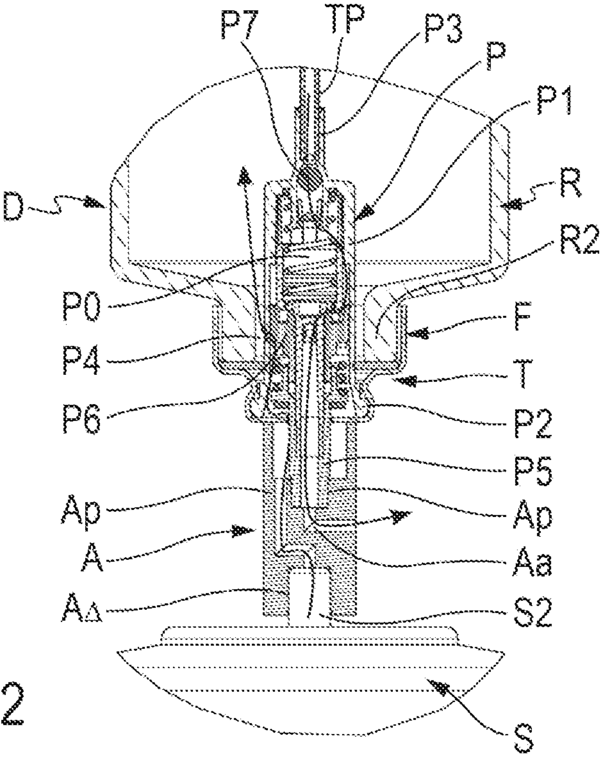
FIG. 2 is a very greatly enlarged view of a detail of FIG. 1*b* showing the adapter connecting the source to the dispenser.
Figure 6C:
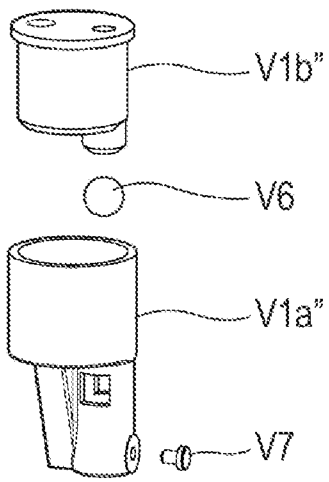
Figure 7:
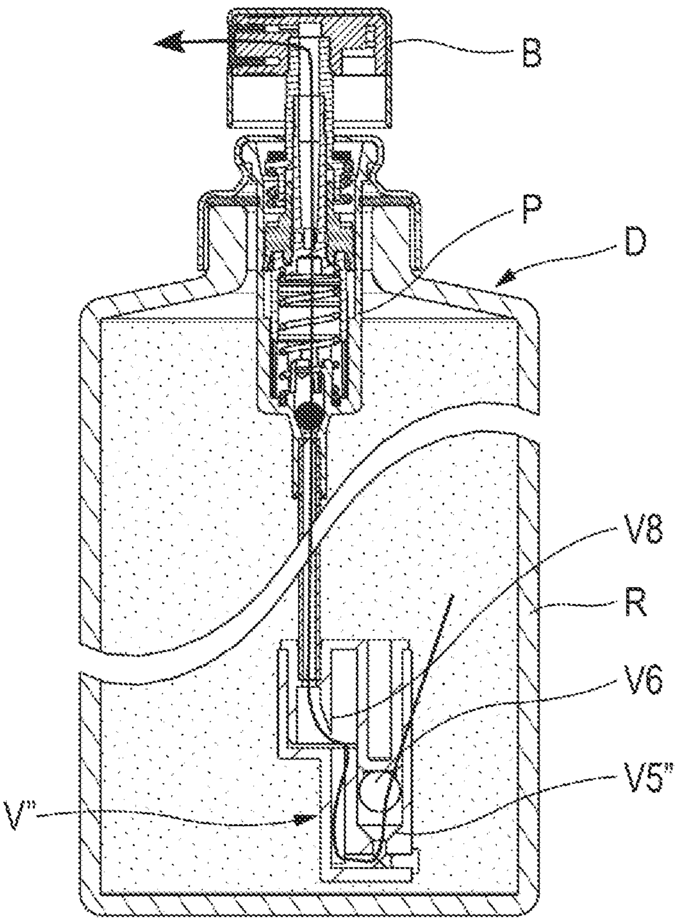
Figure 8:
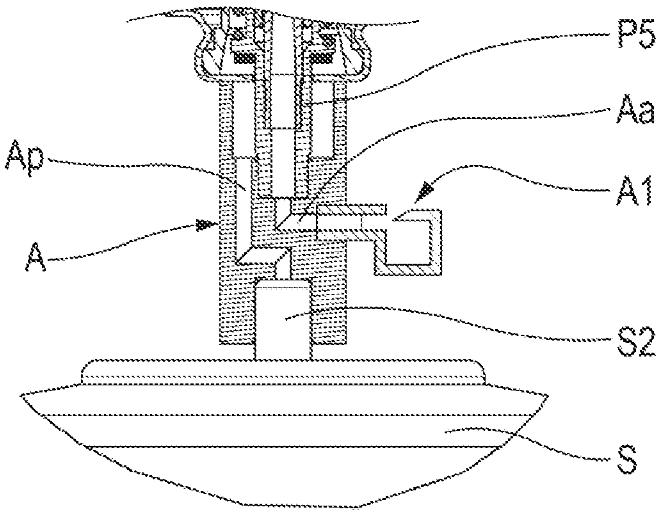

FIG. 6*c* is an exploded view of the shut-off valve of FIGS. 6*a* and 6*b*, FIG. 7 is a view of a dispenser of the invention integrating the shut-off valve of FIGS. 6*a* to 6*c* in the normal position of use, FIG. 8 is a view similar to the FIG. 2 showing a variant embodiment for the adapter of the invention.

Figure 1A:
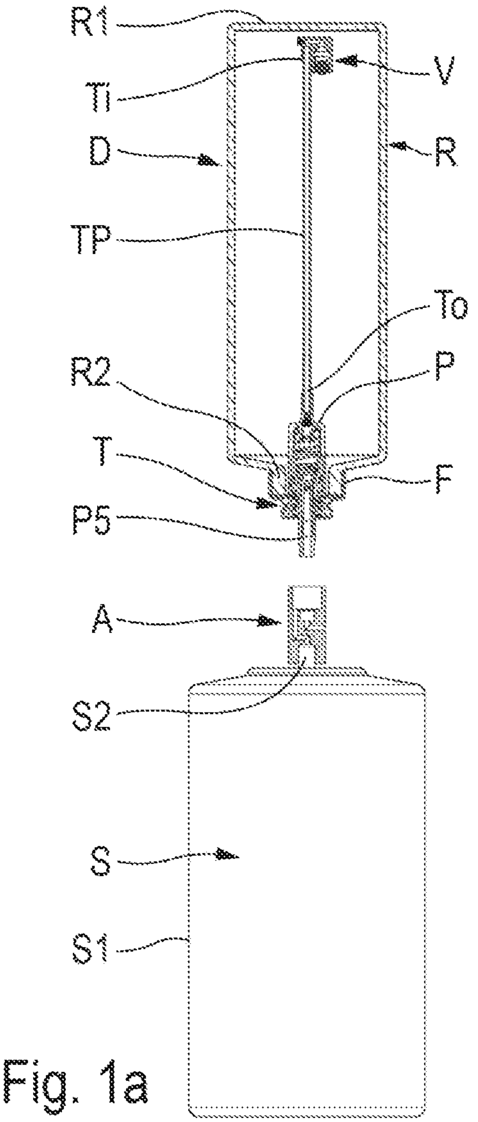
Figure 1B:
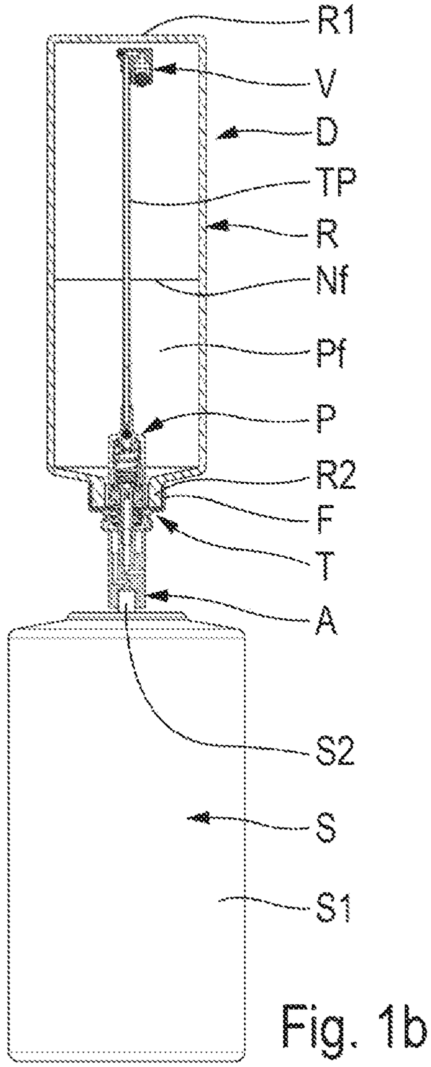

FIGS. 1*a* and 1*b* each show an assembly comprising, on the one hand, a fluid product dispenser D and, on the other hand, a fluid product source S. The dispenser D can have a design that is entirely conventional for a return air dispenser: its only originality coming from a shut-off valve V mounted at a free end Ti of a dip tube TP. α α

Thus, the dispenser D comprises a fluid product reservoir R defining a bottom R1 and a neck R2. The dispenser D also comprises a dispensing head T which makes it possible to take the fluid product stored in the reservoir R and to dispense it, in particular in sprayed form. The dispensing head T comprises a dispensing member P, that can, in this case, be a pump or a valve. This dispensing member P is mounted on and in the neck R2 of the reservoir R by means of a fastener F, which can be conventional. The dip tube TP extends from the dispensing member P to the vicinity of the bottom R1 of the reservoir R. Although not shown in FIGS. 1*a* and 1*b*, the dispenser D also comprises a pusher that is mounted on the dispensing member P. In FIGS. 1*a* and 1*b*, this pusher has been removed. The dispenser D without its pusher has been disposed upside down, with the reservoir R above the dispensing member P, so as to be able to be associated with the fluid product source S.

This source S comprises a source reservoir S1 preferably containing the pressurised fluid product. The source S is equipped with a source valve S2, through which the pressurised fluid product can be dispensed. The source S is provided with an adapter A that enables the dispenser D to be connected in order to be able to inject pressurised fluid product from the source S into the reservoir R of the dispenser D. The dispenser D is therefore associated with the adapter A in the upside down position, as can be seen in FIG. 1*b*.

FIG. 2 shows in greater detail the dispensing member P and the adapter A.

The dispensing member P comprises a body P1 which forms at its upper end, a collar P2 used for fastening the body P1 in the neck R2 by means of the fastener F. At its lower end, the body P1 forms a receiving tube P3, in which the dip tube TP is engaged. The body P1 is formed with a vent hole P4 that makes it possible to communicate the inside of the body P1 with the inside of the reservoir R. The inside of the reservoir R thus communicates with the outside through a vent path that extends through the dispensing member P. The dispensing member P also comprises an actuation rod P5 that is axially movable back-and-forth inside the body P1. A piston P6 is mounted on the actuation rod P5 to slide in a sealed manner inside the body P1 under the action of a return spring. This piston P6 forms, with the rod P5, an outlet valve for the fluid product coming from an internal chamber P0 formed inside the body P1. An inlet valve P7 is also provided between the internal chamber P0 and the dip tube TP. For example, this inlet valve P7 can be in the form of a ball that rests selectively on a seat formed by the body P1.

This is an entirely conventional design for an atmospheric or return air pump making it possible to pump fluid product into the reservoir R and to repel it through the actuation rod P5. This pump also makes it possible to make outside air enter into the reservoir R through the vent path that ends with the vent hole P4.

The adapter A, which can be associated or integrated with the fluid product source S, comprises a first connection sleeve As for the source valve S2 and a second connection sleeve Ap for the valve rod P5 of the dispensing member P. The connection sleeve As communicates directly with the vent path of the dispensing member P through a filling duct Ap. The second connection sleeve Ap is connected to the outside through a vent duct Aa. Thus, the actuation of the source valve S2 makes it possible to inject fluid product into the reservoir R of the dispenser D through the filling duct Ap and the vent path of the dispensing member P. The injected fluid product enters the reservoir R through the vent hole P4. Simultaneously, the air contained in the reservoir R of the dispenser D is discharged through the dip tube TP, the inlet valve P7 in the open state, the internal chamber P0, the outlet valve in the open state, the actuation rod P5 and finally the vent duct Aa of the adapter A.

The adapter A thus makes it possible to implement the particular filling method of the above-mentioned document EP3310491.

Figure 3:
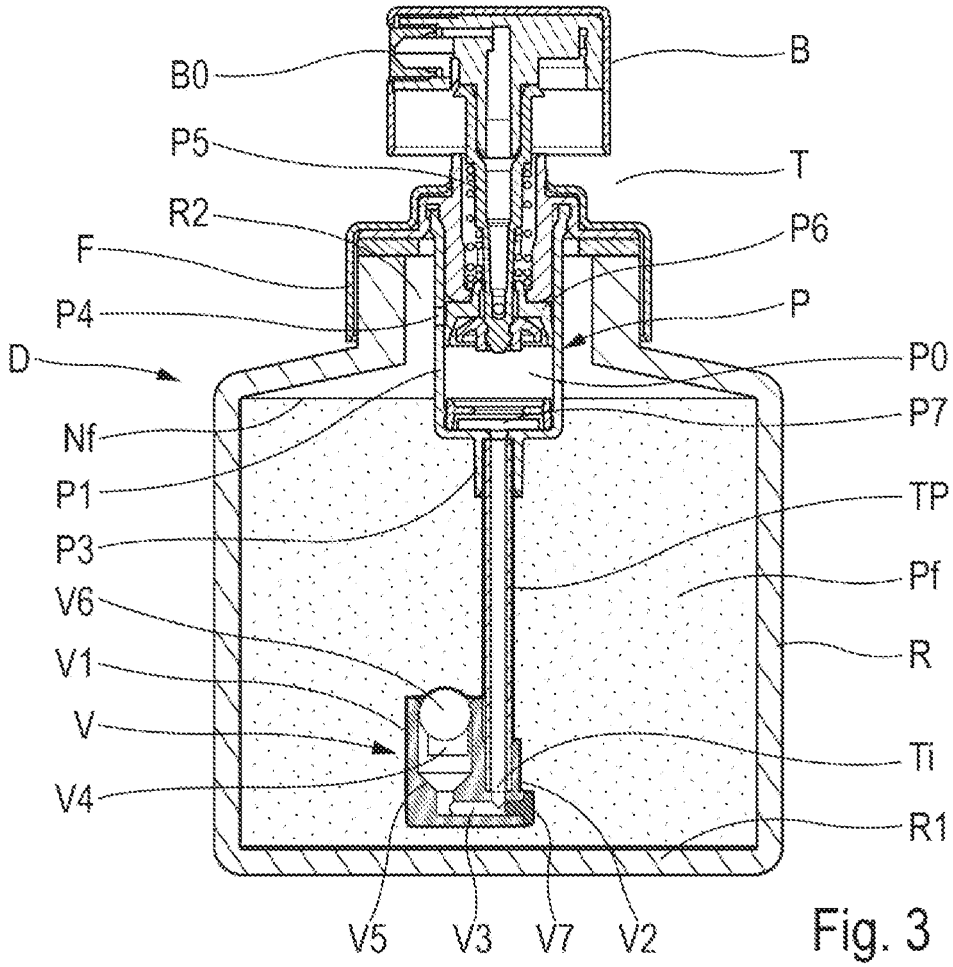
FIG. 3 is a vertical cross-sectional view through another dispenser of the invention.

FIG. 3 also shows a dispenser of the invention, which differs from that of FIGS. 1*a*, 1*b* and 2 only in detail. This dispenser D also comprises a reservoir R with a bottom R1 and a neck R2. The dispensing head T comprises a pump P mounted on and in the neck R2 by a fastener F. The pump P comprises a body P1 provided with a tube holder P3 for a dip tube TP, the lower end Ti of which is provided with a shut-off valve V according to the invention. The body P1 internally defines a chamber P0 that is isolated from the dip tube TP by an inlet valve P7. An actuation rod P5 is axially movable back-and-forth in the body P1 against a return spring. The actuation rod P5 supports a piston P6 which also acts as an outlet valve. The body P1 laterally forms a vent hole P4 that communicates with the inside of the reservoir, more specifically at its neck R2. The actuation rod P5 is capped by a pusher B which is fitted with a dispensing orifice BO, advantageously making it possible to dispense the fluid product coming from the reservoir R in the form of a spray of fine droplets of fluid product. In FIG. 3, the pump P is in the rest state. Its vent hole P4 is masked or closed off by the piston P6. However, it can easily be understood that the movement of the piston P6 unmasks the vent orifice P4 so as to create a communication between the inside of the reservoir R and the outside of the dispenser through the pump P. This vent passage can in particular pass around the actuation rod P5.

It can be said that the dispenser D of FIG. 3 is of a design that is entirely conventional for an atmospheric or return air dispenser that makes it possible to allow outside air to penetrate into the reservoir R as the fluid product is extracted from the reservoir by the pump P. When the reservoir R is full, as shown in FIG. 3, the level of the fluid Nf is situated in the vicinity of the neck R2, thus leaving a quantity of air inside the reservoir that is sufficient to absorb pressure and/or temperature variations. According to the invention, as mentioned above, the lower end Ti of the dip tube TP is provided with a shut-off valve V, which makes it possible to selectively close off the access to the dip tube TP. This shut-off valve V operates mainly when the dispenser D is disposed upside down, as shown in FIGS. 1*b* and 2, at the end of filling.

This shut-off valve V comprises a valve body V1 that can be made as a single piece. The valve body V1 forms a receiving housing V2 for the lower end Tl of the dip tube TP. This receiving housing V2 communicates with a connecting duct V3 that opens into a chamber V4. The chamber V4 forms a valve seat V5 for a movable member V6 that is, in this case, a floating ball that can be solid or hollow. It is sufficient for its density to be lower than that of the fluid. This ball V6 can move inside the chamber V4 so as to come selectively into sealed contact with its valve seat V5. For moulding reasons, the shut-off valve V also comprises a stopper V7 that enables the connecting duct V3 to be moulded.

It can be noted that the chamber V4 forming the valve seat V5 and the ball V6 are disposed adjacent to the dip tube TP.

In FIG. 4*a*, the dispenser is upside down with the bottom R1 of the reservoir R disposed at the top. The valve seat V5 is disposed above the ball V6. It can be noted that the fluid level Nf in the reservoir R is situated substantially at the level of the floating ball V6, which can thus float inside its chamber V4. The shut-off valve V is then open and the air contained in the reservoir R can be forced through the dip tube TP and the pump P.

By continuing the filling of the reservoir R according to the method illustrated in FIGS. 1*b* and 2, the configuration shown in FIG. 4*b* is reached. The fluid level Nf is thus situated above the valve seat V5 and the ball V6, which is then urged by floating against its seat V5. The shut-off valve V is in its closed state, preventing any fluid or air communication with the dip tube TP.

In this way, the discharging of the air stored in the reservoir through the dip tube TP during the filling of the reservoir R is not prevented, but any spilling of fluid product through the dip tube TP is prevented, at the end of filling of the reservoir R. In summary, the air is discharged, but not the fluid product. There then remains in the reservoir a minimum quantity of air, referenced Air.min in FIG. 4*b*. From the moment when the shut-off valve V is closed, fluid product can still be injected into the reservoir R, thereby pressurising the air in the reservoir, until the pressures are balanced with that of the fluid product source S.

Once the reservoir R of the dispenser D has been filled, it can be put back upright and used conventionally: the ball V6 of the shut-off valve V being urged by floating away from its seat V5. When the reservoir R is almost empty, the ball V6 falls back onto its seat V56: the shut-off valve V is then closed again.

FIGS. 5*a* and 5*b* show in a greatly enlarged form, a second embodiment for a shut-off valve V' of the invention. This second shut-off valve V' differs from the preceding one by its axial symmetry relative to the dip tube TP. The shut-off valve V' comprises a valve body V1' that is engaged on the bottom end Ti of the dip tube TP. This body V1' is substantially with a rotational symmetry. It comprises a connecting duct V3' that connects the outlet of the dip tube TP directly to the outside of the body V1'. The body V1' forms an annular or frustoconical valve seat V5' oriented downwards in FIGS. 5*a* and 5*b*. The shut-off valve V' also comprises a cap V6' that is engaged around the body V1', while being able to move axially over a limited stroke. This cap V6' acts as a movable valve member, in the same way as the ball V6 of the first embodiment. This cap V6' has a density that is lower than that of the fluid product Pf. In other words, the cap V6' floats in the fluid product Pf. The cap V6' forms an annular or frustoconical contact zone V65 facing the annular or frustoconical valve seat V5'. In this way, the contact zone V65 can come into sealed contact with the valve seat V5' by moving the cap V6' relative to the body V1'.

In FIG. 5*a*, it can be noted that the fluid level Nf is situated below the shut-off valve V'. Consequently, the cap V6' is surrounded by air and is subjected to gravity. It therefore rests on the body V1', such that a gap is present between the seat V5' and the contact zone V65. The air contained in the reservoir can thus be discharged through the shut-off valve V' in the open state and the dip tube TP, as shown by the arrowed line in FIG. 5*a*. The fluid product can be injected into the reservoir R through the vent path, as shown in FIGS. 1*a* and 2.

However, when the level of fluid Nf reaches the level of the cap V6', the cap starts to float and therefore moves so as to establish sealed contact between the valve seat V5' and the contact zone V65. This is shown in FIG. 5*b*. The shut-off valve V' is then in its closed state. The fluid product Pf cannot thus be discharged through the dip tube TP. The fluid level Nf stabilises and a minimum volume of air Air.min remains in the reservoir.

In this second embodiment, it can be noted that the valve seat V5' and the contact zone V65 extend coaxially around the dip tube Tp.

FIGS. 6*a*, 6*b*, 6*c* and 7 show a third embodiment for a shut-off valve V" of the invention. This shut-off valve V" differs from the first two embodiments in that it integrates a sound device V8 that can be described as a whistle. A sound or a whistling is produced by virtue of a particular configuration forcing the airflow to take a path generating a resonance. It is the same principle as all wind instruments. Apart from this particular sound indicator device V8, the shut-off valve V" also comprises a ball V6 that floats in the fluid product Pf so as to be pressed against its valve seat V5" when the fluid level Nf reaches the valve seat, as can be seen in FIG. 6*b*. The shut-off valve V" is then closed and communication with the dip tube TP is cut off.

Thus, the whistle V8 emits a sound that is perceptible to the user throughout the filling operation, because the air stored in the reservoir is discharged into the dip tube TP through the whistle V8. The perception of the sound generated by the whistle V8 thus gives the user an audible indication that the filling process is in progress. And as soon as the sound generated by the whistle V8 stops, the user knows that the filling operation is finished. They can then disconnect the dispenser D from the fluid product source S, as shown in FIG. 1*a*.

In FIG. 6*c*, it can be seen that the shut-off valve V" comprises four component elements, namely a body V1*a*", an insert V1*b*", a floating ball V6, and a stopper V7. The insert V1*b*" is engaged inside the body V1*a*" so as to form between them the cage where the ball V6 moves, and the whistle V8.

Once the dispenser is filled, it can be turned upright, as shown in FIG. 7. It can be actuated by pressing on its pusher B, so as to dispense more doses of fluid product. Next, fluid product coming from the reservoir is sucked into the pump P through the shut-off valve V", which is forced into the open state, because the floating ball V6 is immersed in the fluid product. The whistle V8 is neutralised, given that it is filled with fluid product.

With reference to FIG. 8, the adapter A of FIGS. 1*a*, 1*b* and 2 can be seen equipped with an accessory or device A1, which also makes it possible to generate a sound that is perceptible to the user. To do this, this device A1 is mounted at the outlet of the air duct Aa of the adapter A. Thus, the device A1 is passed through by the airflow discharged through the dip tube TP. Like the whistle V8, the user is warned by the stop of sound that the filling operation is finished and that they can then remove the dispenser from the adapter A.

The sound device A1 can be an accessory of the adapter A, but it can also be integrated into the adapter A, for example in the form of a particular configuration of the air discharge duct Aa for generating sound, such as a whistling or a clicking sound.

Although not shown, it is also possible to provide a detector that detects the absence of airflow at the outlet of the adapter A such that the detector can send a stop signal that stops the injection of fluid product.

The shut-off valve of the invention makes it possible to design a filling method comprising the following steps:

a—removing the pusher B from the actuation rod P5, b—disposing the dispenser D upside down with the fluid product reservoir R situated above the dispensing head T, c—depressing the actuation rod P5 to open the vent path and the fluid communication between the actuation rod P5 and the dip tube TP, d—injecting the fluid product through the vent path, allowing the air coming from the reservoir R to escape through the dip tube TP and the actuation rod P5, until the fluid product injected into the reservoir R urges the moving member V6, V6' into sealed contact against the seat V5, V5', V5".

The device V8 or A1 enables the user to know when filling is finished.

Thanks to the shut-off valve of the invention, disposed at the end of the dip tube, any spilling of fluid through the dip tube is prevented. This makes it possible to avoid any loss of fluid at the outlet of the adapter A, but also to maintain a minimum volume of air inside the reservoir.

The invention claimed is:

1. A fluid product dispenser, comprising:

a fluid product reservoir R defining a bottom and an opening, and a dispensing head mounted on and in the opening of the fluid product reservoir, the dispensing head integrating a dispensing member, such as a pump, defining a vent path through which outside air can penetrate into the fluid product reservoir, the dispensing member further comprising a dip tube that extends into the reservoir, the dip tube comprising an inlet close to the bottom of the fluid product, characterized in that the inlet of the dip tube is provided with a shut-off valve comprising a movable member and a seat, the movable member is urged into sealed contact with the seat by the fluid product when the dispenser is upside down with the fluid product reservoir disposed above the dispensing head, while the movable member is urged away from the seat by the fluid product when the dispenser is upright with the dispensing head disposed above the fluid product reservoir.

2. The dispenser according to claim 1, wherein the moving member has a density lower than that of the fluid product, such that it floats in the fluid product.

3. The dispenser according to claim 1, wherein the fluid product reservoir with the dispensing head mounted thereon and therein defines a useful volume, the seat being disposed in the fluid product reservoir close to the bottom, so as to maintain in the fluid product reservoir that is filled with fluid via the vent path with the dispenser upside down, a quantity of air that is sufficient to absorb pressure and/or temperature variations.

4. The dispenser according to claim 1, wherein the shut-off valve comprises a valve body forming the seat and a connection sleeve for the inlet of the dip tube, the movable member being trapped in the valve body with an axial degree of freedom enabling it to come selectively into sealed contact with the seat.

5. The dispenser according to claim 1, wherein the movable member is a cap engaged around the valve body, the seat extending around the dip tube and the cap defining an annular contact zone intended to come into sealed contact with the seat, this annular contact zone extending around the dip tube.

6. The dispenser according to claim 1, wherein the shut-off valve is provided with a device for delivering perceptible information, in particular a sound that is perceptible to a user, the perceptible information being generated in response to an airflow passing through the shut-off valve.

7. An assembly comprising a fluid product source, an adapter defining a filling duct and a vent duct, and a dispenser according to claim 1, the adapter making it possible to connect the fluid product source to the dispenser so as to make a fluid product flow and an airflow to intersect each other, the adapter being provided with a device providing information that is perceptible, in particular a sound that is perceptible to a user, the perceptible information being generated in response to an airflow passing through the vent duct of the adapter.

8. A method for filling a dispenser according to claim 1, the dispensing head comprising a pusher removably mounted on an actuation rod that is in fluid communication with the dip tube through a chamber and at least one valve, the method comprising the following steps:

a—removing the pusher from the actuation rod, b—disposing the dispenser (D upside down with the fluid product reservoir (R) situated above the dispensing head, c—depressing the actuation rod to open the vent path and the fluid communication between the actuation rod and the dip tube, d—injecting the fluid product through the vent path, allowing the air (coming from the reservoir R to escape through the dip tube and the actuation rod, until the fluid product injected into the reservoir urges the moving member into sealed contact against the seat.

9. The dispenser according to claim 1, wherein the movable member is a hollow ball.

10. The dispenser according to claim 9, wherein the seat and the ball are disposed beside the dip tube.

* * * * *